(12) United States Patent
Sonnenberg et al.

(10) Patent No.: US 10,751,895 B2
(45) Date of Patent: Aug. 25, 2020

(54) APPARATUS FOR TESTING RAZOR BLADES AND METHOD FOR SAME

(71) Applicant: The Gillette Company LLC, Boston, MA (US)

(72) Inventors: Neville Sonnenberg, Newton, MA (US); Peter Bradley, Reading (GB)

(73) Assignee: The Gillette Company LLC, Boston, MA (US)

( * ) Notice: Subject to any disclaimer, the term of this patent is extended or adjusted under 35 U.S.C. 154(b) by 88 days.

(21) Appl. No.: 15/978,797

(22) Filed: May 14, 2018

(65) Prior Publication Data

US 2018/0333878 A1 Nov. 22, 2018

Related U.S. Application Data

(60) Provisional application No. 62/508,607, filed on May 19, 2017.

(51) Int. Cl.
*B26B 21/40* (2006.01)
*G01N 3/58* (2006.01)
*B26B 21/22* (2006.01)

(52) U.S. Cl.
CPC ...... *B26B 21/4093* (2013.01); *B26B 21/4081* (2013.01); *G01N 3/58* (2013.01); *B26B 21/225* (2013.01); *B26B 21/4068* (2013.01); *G01N 2203/0075* (2013.01)

(58) Field of Classification Search
CPC .............. G01N 3/58; G01N 2203/0075; B26B 21/4093; B26B 21/225; B26B 21/4068
USPC .................................. 73/7, 104; 30/347–357
See application file for complete search history.

(56) References Cited

U.S. PATENT DOCUMENTS 1,983,597 A * 12/1934 Casselman ............... G01N 3/58
73/104

\* cited by examiner

*Primary Examiner* — Robert R Raevis
(74) *Attorney, Agent, or Firm* — Joanne N. Pappas; Kevin C. Johnson

(57) ABSTRACT

An apparatus for testing a razor blade comprises a base, a material support table, a material sample, a transport carriage, a blade retention assembly, and a razor blade. The material support table is supported by the base. The transport carriage is movably coupled with the base and is movable with respect to the material support table between a start position and an end position. The blade retention assembly is movably coupled with the transport carriage and is movable with respect to the material support table between a blade-engaged position and a blade disengaged position. The blade retention assembly is movable together with the transport carriage between the start position and the end position. The blade is releasably attached to the blade retention assembly. The razor blade contacts the material sample when the blade retention assembly is in the blade-engaged position. Methods are also provided.

8 Claims, 14 Drawing Sheets

APPARATUS FOR TESTING RAZOR BLADES AND METHOD FOR SAME

TECHNICAL FIELD OF THE INVENTION

The systems described below generally relate to an apparatus and method for testing razor blades. In particular, the disclosure relates to an apparatus and method for measuring the tip bending resistance of an edge of a razor blade.

BACKGROUND OF THE INVENTION

During shaving with a razor, the razor blades can incur edge bending damage from the hair being shaved. During testing of a razor blade, manufacturers can test the tip bending resistance to determine how many times a cartridge can be used before it should be discarded.

SUMMARY OF THE INVENTION

In accordance with one embodiment, an apparatus for testing a razor blade is provided. The apparatus comprises a base, a material support table, a material sample, a transport carriage, a blade retention assembly, and a razor blade. The material support table is supported by the base. The material sample is disposed on the material support table. The transport carriage is movably coupled with the base and is movable with respect to the material support table between a start position and an end position. The blade retention assembly is movably coupled with the transport carriage and is movable with respect to the material support table between a blade-engaged position and a blade disengaged position. The blade retention assembly is movable together with the transport carriage between the start position and the end position. The blade is releasably attached to the blade retention assembly. The razor blade contacts the material sample when the blade retention assembly is in the blade-engaged position. When the transport carriage is moved from the start position to the end position with the blade retention assembly in the blade-engaged position, the razor blade shaves a portion of the material strip.

In accordance with another embodiment, a method for testing edge damage of a razor blade is provided. The method comprises loading the razor blade onto a blade retention assembly and moving the blade retention assembly into a blade-engaged position such that the razor blade contacts a material sample supported by a material support table. The blade retention assembly is movably coupled with a transport carriage that is slidable with respect to the material support table. The method further comprises sliding the transport carriage from a start position to an end position relative to the material sample to shave a portion of the material sample with the razor blade and moving the blade retention assembly into a blade disengaged position such that the razor blade is spaced from the material strip. The method still further comprises removing the razor blade from the blade retention assembly, and measuring the edge damage of the razor blade.

In accordance with yet another embodiment, a method for testing edge damage on a razor blade is provided. The method comprises providing a material sample having a plurality of looped synthetic fibers extending therefrom, the synthetic fibers having a diameter of between about 20 μm and about 200 μm, and shaving the material sample with the razor blade.

BRIEF DESCRIPTION OF THE DRAWINGS

It is believed that certain embodiments will be better understood from the following description taken in conjunction with the accompanying drawings in which.

DETAILED DESCRIPTION OF THE INVENTION

Figure 1:
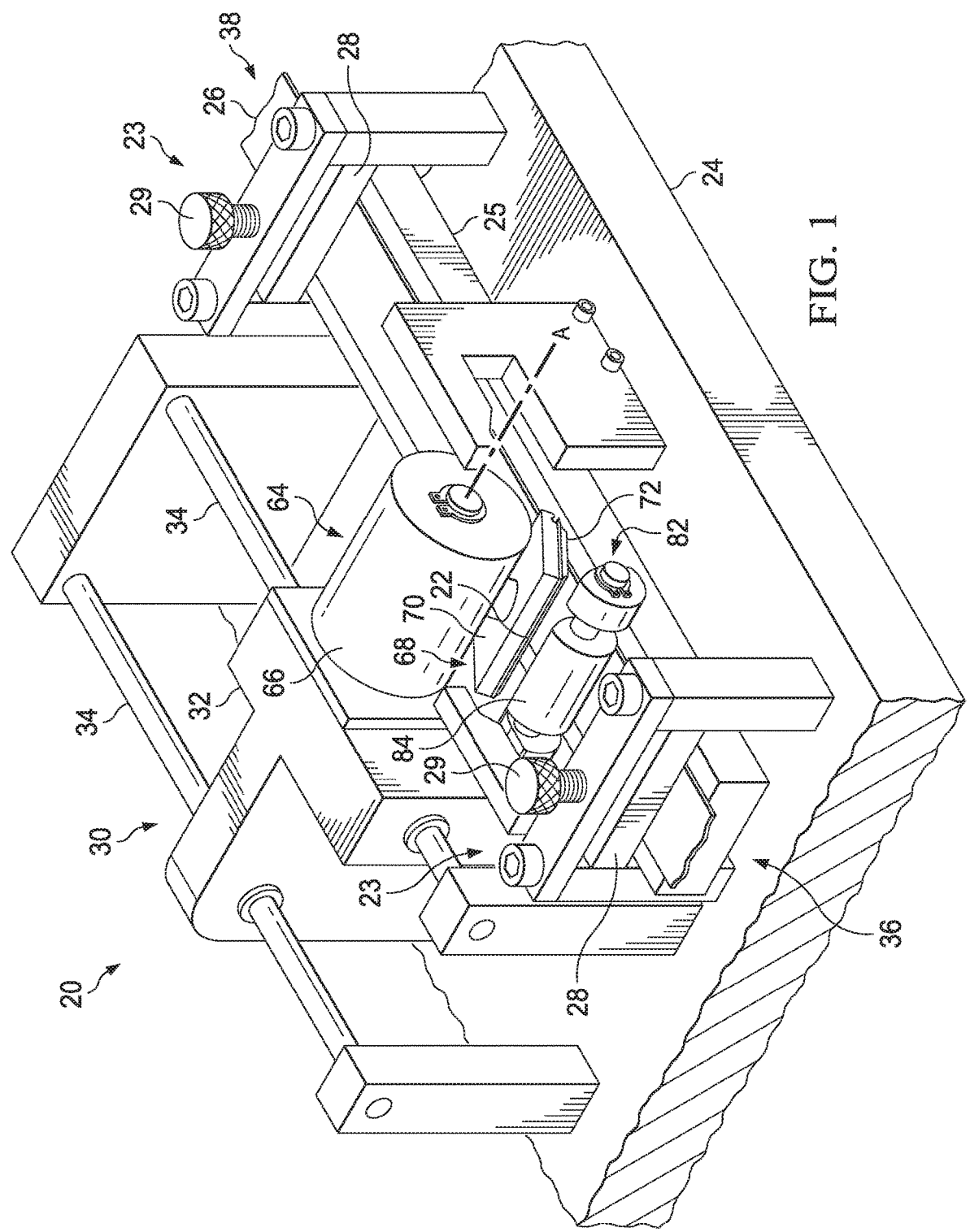
FIG. 1 is an isometric view depicting a testing apparatus for a razor blade, in accordance with one embodiment, with a transport carriage shown in a start position and with a blade retention assembly in a blade-engaged position.

In connection with the views and examples of FIGS. 1-27, wherein like numbers indicate the same or corresponding elements throughout the views, a testing apparatus 20 for a razor blade 22 is provided. As will be described in more detail below, the testing apparatus 20 can provide a simulated, repeatable shaving environment that imparts edge damage to the razor blade 22 for use in testing the razor blade 22 (e.g., for comparative analysis). Referring now to FIGS. 1-4, the testing apparatus 20 can include a base 24 and a material support table 25 supported by the base 24. A material sample 26 can be provided on the material support table 25 for shaving with the razor blade 22. As will be described in further detail below, the material sample 26 can provide a shaving surface that simulates a typical shaving environment for the razor blade 22, such as damp human hair, for example.

A pair of clamping assemblies 23 can facilitate selective and lateral securement of the material sample 26 to the material support table 25. Each clamping assembly 23 can include a bar clamp 28 and a knurled bolt 29 and is threadably coupled with the bar claim 28 such that rotation of the knurled bolts 29 facilitates vertical movement of the bar clamp 28 with respect to the material support table 25. Each clamping assembly can be disposed at one of the opposing ends of the material support table 25. The material sample 26 can be sandwiched between material support table 25 and the bar clamps 28 and selectively secured therebetween through rotation of the knurled bolts 29 (e.g., in a clockwise direction) such that the material sample 26 is held in place by the bar clamps 28 during shaving with the razor blade 22.

Figure 2:
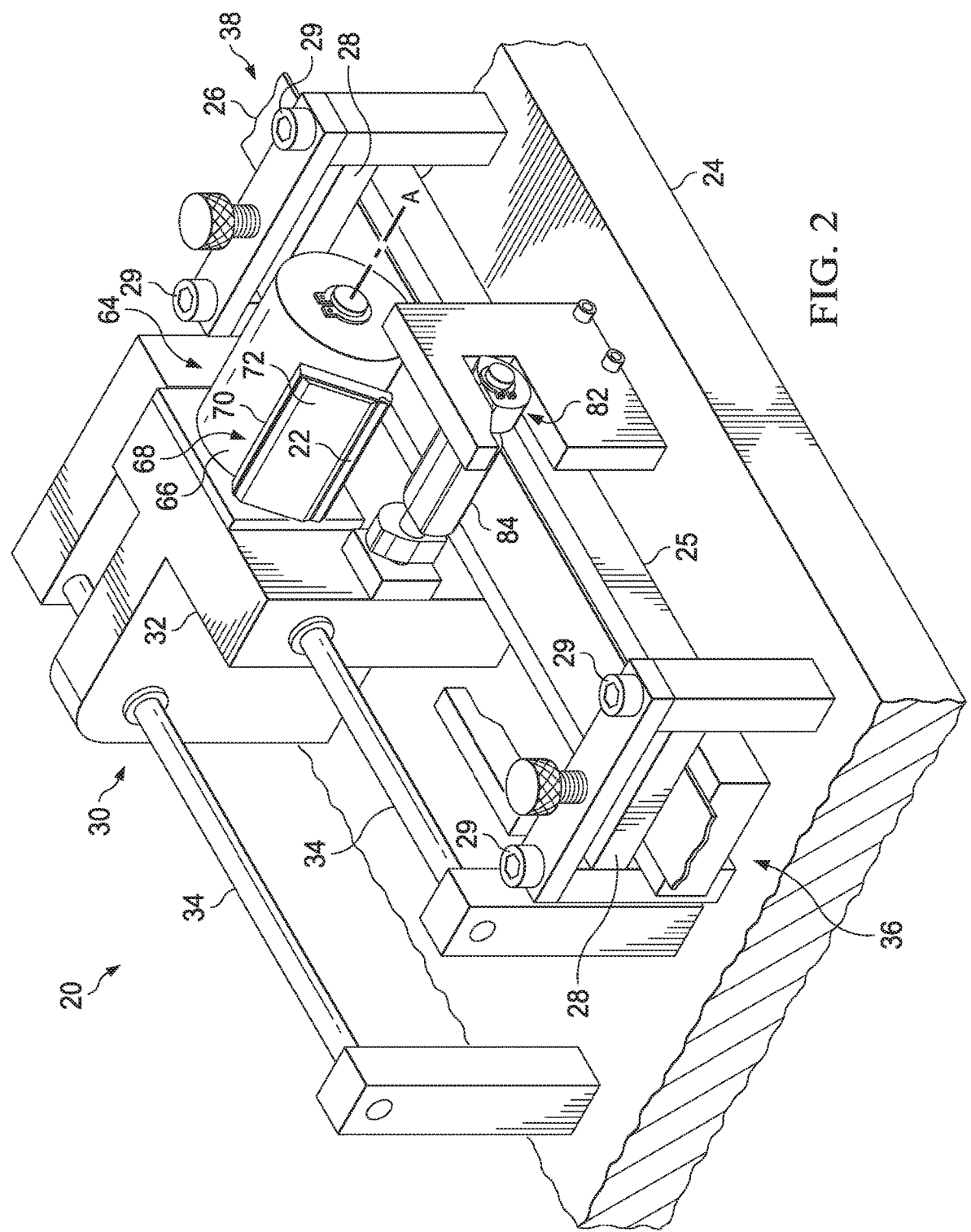
FIG. 2 is an isometric view depicting the testing apparatus of FIG. 1, but with the transport carriage shown in an end position and the blade retention assembly in a blade disengaged position.

Still referring to FIGS. 1-4, the testing apparatus 20 can include a transport carriage 30 that is movably coupled with the base 24 and movable with respect to the material support table 25 between a start position (FIG. 1) and an end position (FIG. 2). In one embodiment, the transport carriage 30 can include a main body 32 that is slidably coupled to a pair of rods 34 that are supported by the base 24 and oriented substantially parallel to the direction of travel of the material 26 (shown as an arrow A in FIG. 4). The rods 34 can be spaced from one another and can each extend between a front end 36 and a rear end 38 of the base 24. The main body 32 can slide along the rods 34 to facilitate sliding of the transport carriage 30 between the start position and the end position. The main body 32 can include a pair of internal recirculating ball bushings (not shown) that each surround one of the rods 34 and cooperate to facilitate sliding of the main body 32 along the rods 34.

Figure 5:
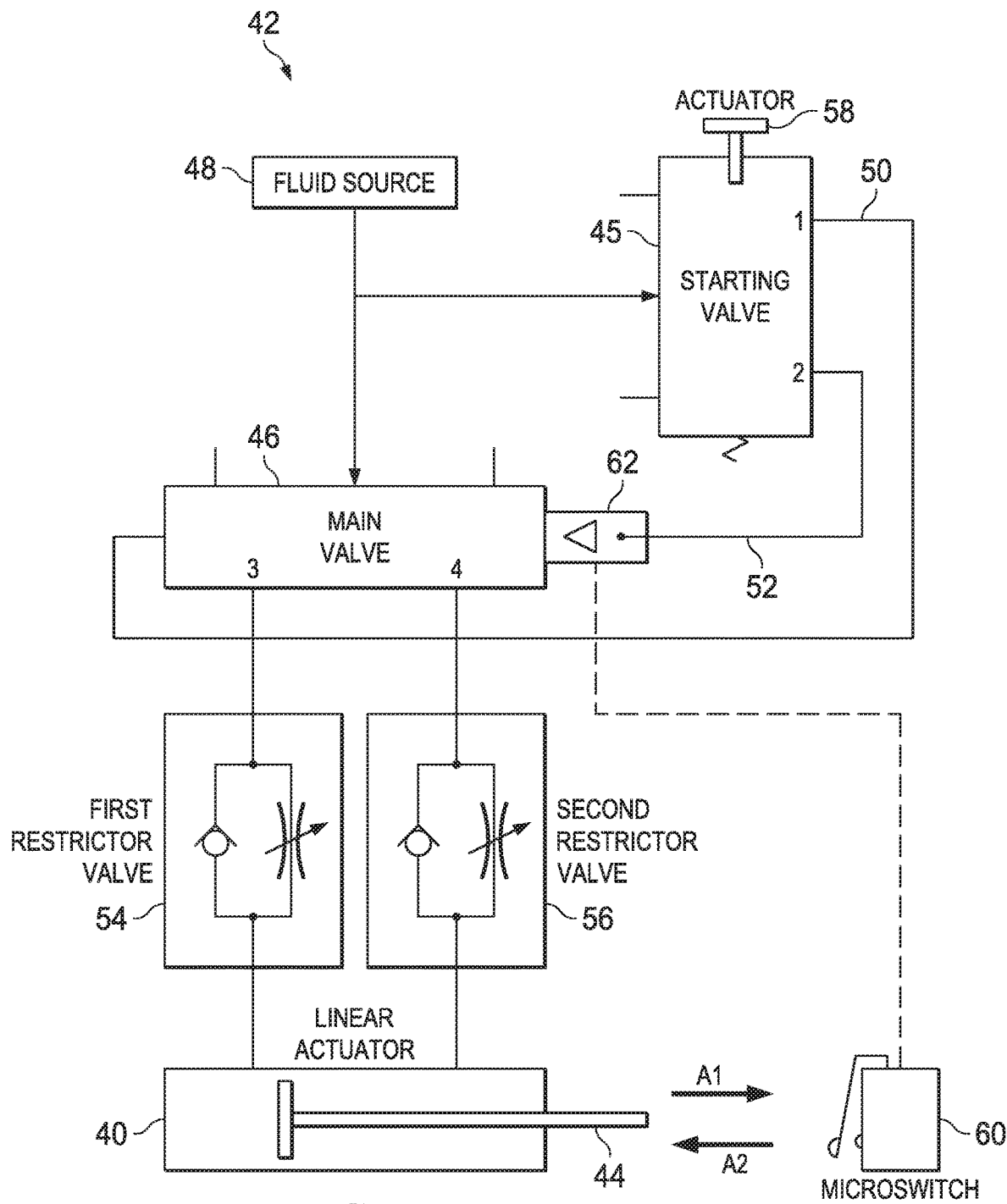
FIG. 5 is a schematic view depicting a pneumatic fluid network.

In one embodiment, as illustrated in FIG. 5, a linear actuator 40 can be operably coupled with the transport carriage 30 and configured to facilitate sliding of the transport carriage 30 between the start position and the end position. The linear actuator 40 can be in fluid communication with a pneumatic fluid network 42 and can include a plunger 44 that is slidable between a retracted position and an extended position in response to fluid from the pneumatic fluid network 42. The plunger 44 can be coupled with the transport carriage 30 (e.g., the main body 32) such that operation between the retracted position and the extended position facilitates movement of the transport carriage 30 between the start position and the end position.

The pneumatic fluid network 42 can include a starting valve 45 and main valve 46 that are each in fluid communication with a fluid source 48, such as a pressurized air source. The starting valve 45 can be in fluid communication with the main valve 46 via first and second fluid passageways 50, 52. The main valve 46 can be in fluid communication with opposite sides of the plunger 44 via first and second restrictor valves 54, 56. The starting valve 45 can include an actuator 58 (e.g., a pushbutton) which when actuated (e.g., depressed) allows fluid to flow through the first fluid passageway 50 and to the main valve 46. In response, a spool (not shown) in the main valve 46 can move to allow fluid from the fluid source 48 to be provided to the first restrictor valve 54 and to the linear actuator 40 to move the plunger 44 into the extended position (e.g., in the direction of arrow A1) and to move the transport carriage 30 from the start position to the end position. When the transport carriage 30 reaches the end position, a microswitch 60 can be actuated which can actuate a shutoff valve 62 to move the spool (not shown) in the main valve 46. In response, fluid from the fluid source 48 can be provided through the second passageway 52, through the first restrictor valve 54 and to the linear actuator 40 to move the plunger into the retracted position (e.g., in the direction of arrow A2), thereby returning the transport carriage 30 to the start position from the end position. The first and second restrictor valves 54, 56 can be configured to control the flow of fluid to/from the linear actuator 40 thereby controlling the speed with which the plunger 44 moves between the extended and retracted positions. It is to be appreciated that the transport carriage 30 can be movable with respect to the material support table 25 in any of a variety of other suitable arrangements.

Figure 6:
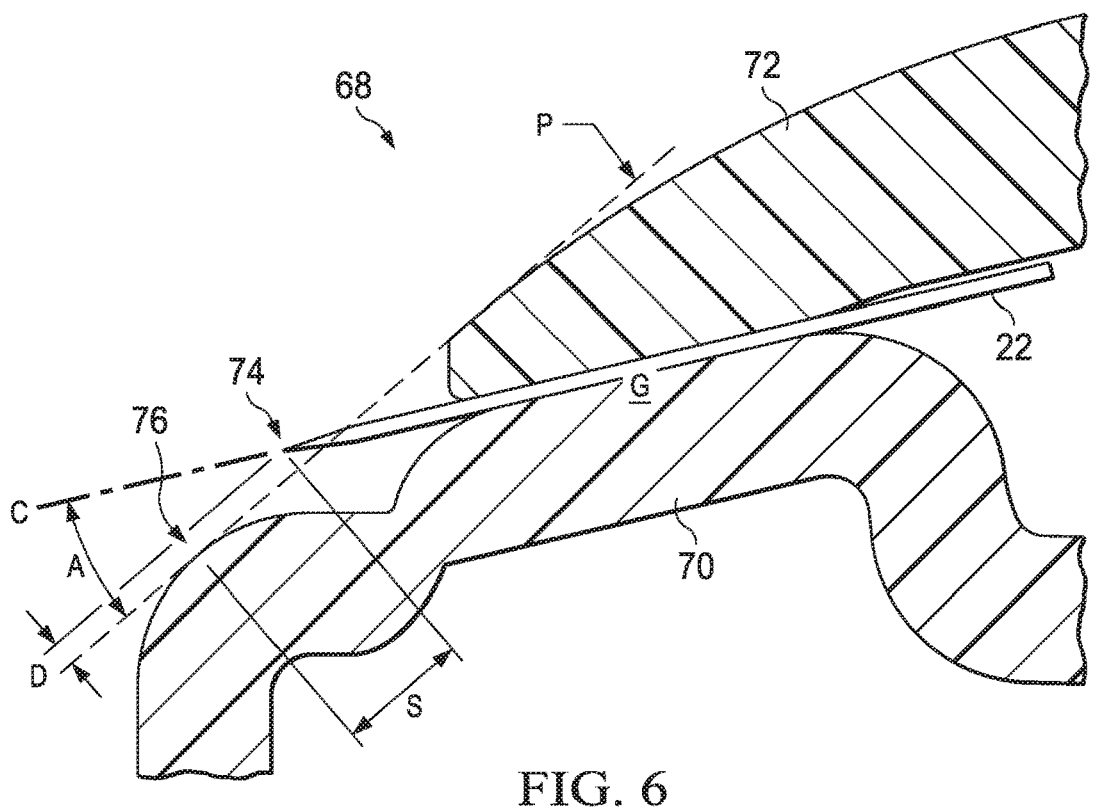
FIG. 6 is an enlarged side view of a razor clamp of the testing apparatus of FIG. 1.

Referring again to FIGS. 1-4, the testing apparatus 20 can include a blade retention assembly 64 that includes a razor cam 66 and a razor clamp 68. The razor clamp 68 can be fixedly coupled with the razor cam 66 and can be configured to facilitate releasable coupling to the razor blade 22 to the razor clamp 68. In one embodiment, as illustrated in FIG. 6, the razor clamp 68 can include a guard member 70 and a clamping member 72 that cooperate to sandwich the razor blade 22 therebetween. The guard member 70 and the clamping member 72 can be secured together by releasable fasteners (not shown) or other suitable releasable securement device that can facilitate selective securement and removal of the razor blade 22 to/from the razor clamp 68.

The razor cam 66 can be coupled, preferably pivotally coupled, with the transport cartridge 30 and can be movable together with the transport carriage 30 between the start position and the end position. The razor cam 66 can be pivotable about a first axis A such that the blade retention assembly 64 is pivotable between a blade-engaged position (FIG. 1) and a blade disengaged position (FIG. 2). When the blade retention assembly 64 is in the blade-engaged position (FIG. 1), the razor clamp 68 can be positioned proximate to the material sample 26 such that the razor blade 22 contacts the material sample 26. When the blade retention assembly 64 is in the blade disengaged position (FIG. 2), the razor clamp 68 can be positioned away from material sample 26 to prevent shaving of the material sample 26 as well as to provide enough clearance from the surrounding components (e.g., the material support table 25) to physically access the razor blade 22 (e.g., to facilitate removal/replacement).

A locking assembly (not shown) can be associated with the razor cam 66 to facilitate selective locking of the blade retention assembly 64 in each of the blade-engaged position (FIG. 1) and the blade disengaged position (FIG. 2). In one embodiment, the locking assembly can include a spring-loaded ball detent that extends between the razor cam 66 and the main body 32 of the transport carriage 30. It is to be appreciated that the blade retention assembly 64 can be provided in any of a variety of other suitable arrangements for moving the razor blade into contact with the material sample 26.

Operation of the transport carriage 30 and the blade retention assembly 64 can be coordinated to simulate a shaving stoke on the material sample 26. For example, when the transport carriage 30 is in the start position, the blade retention assembly 64 can be provided in the blade-engaged position, as illustrated in FIG. 1. The transport carriage 30 can then be slid to the end position, as illustrated in FIG. 2, which can pull the razor blade 22 along the material sample 26 to shave the material sample 26 with the razor blade 22. When the transport carriage 30 reaches the end position, the blade retention assembly 64 can be pivoted to the blade disengagement position to prevent further shaving of the material sample 26 with the razor blade 22 as well as to allow access to the razor blade 22 (e.g., for removal/replacement).

Figure 7:
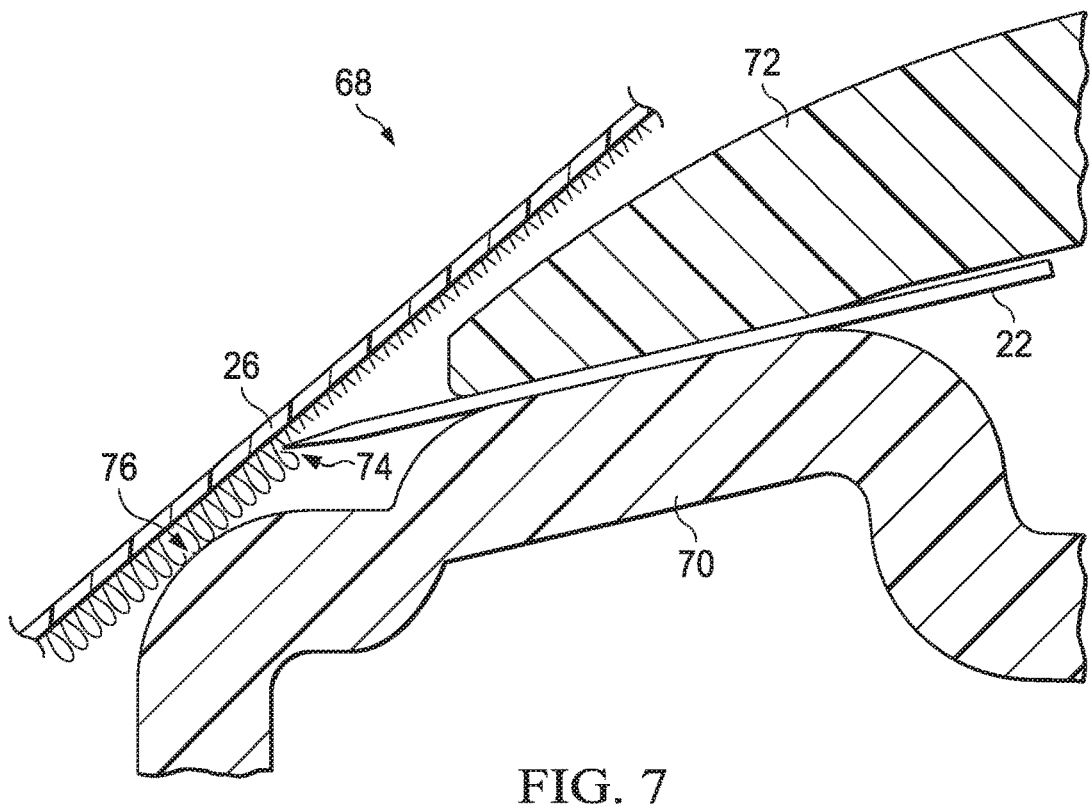
FIG. 7 is an enlarged side view of the razor clamp of FIG. 6 engaged with a material strip.
Figure 8:
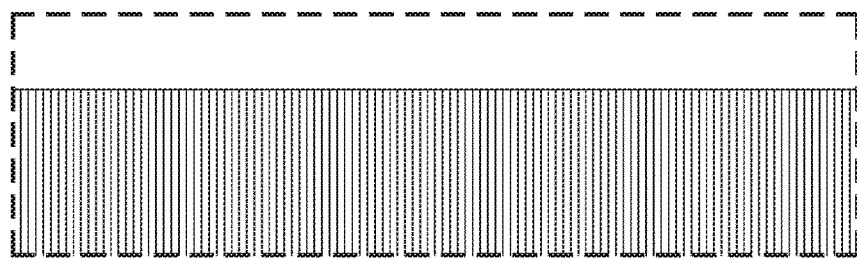
FIG. 8 is cross sectional view depicting a material sample for the testing apparatus, in accordance with one embodiment.
Figure 9:
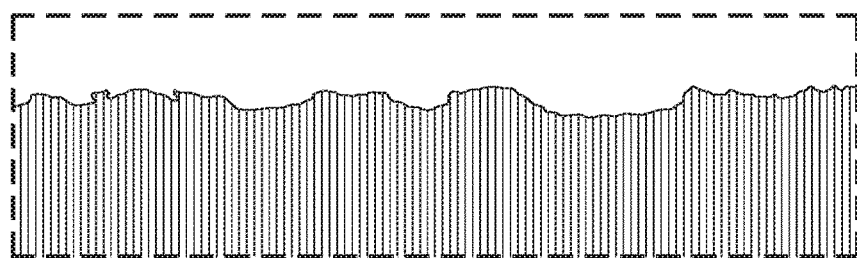
FIG. 9 is cross sectional view depicting the material sample of FIG. 8, but after undergoing cutting with the testing apparatus of FIG. 1.

The razor clamp 68 can be configured to hold the razor blade 22 at a position with respect to the material support table 25 that simulates a user's shaving stroke with respect to the material sample 26 (e.g., for purposes of testing the razor blade 22). As illustrated in FIG. 6, the guard member 70 and the clamping member 72 can cooperate to define a shaving plane P through which a cutting edge 74 of the razor blade 22 can extend. The material sample 26 can substantially reside in, and be substantially parallel to, the shaving plane P. The razor blade 22 can define a centerline C that extends through the cutting edge 74 and is substantially parallel with the rest of the razor blade 22. The shaving plane P and the razor blade 22 can be angled with respect to each other by an angle A (as defined by the shaving plane P and the centerline C), which can, in some embodiments, be between about 21 degrees and about 27 degrees. The distance between the cutting edge 74 and the shaving plane P can define an exposure distance D that can be generally understood to be the area of the razor blade 22 that is exposed to the hair or other fiber during shaving. The guard member 70 can define a contact portion 76 that is configured to initiate contact with a shaving surface during shaving. The distance from the contact portion 76 to the cutting edge 74 can be defined as a span S. It is to be appreciated that the configuration and/or positioning of the guard member 70, the clamping member 72 and/or the razor blade 22 can be selected to achieve a desired angle A, exposure distance D, and span S that facilitate effective testing of the razor blade 22. FIG. 7 illustrates the razor clamp 68 engaged with the material sample 26 (e.g., the transport carriage 30 is in the start position) to facilitate cutting of the material sample 26 with the razor blade 22. FIGS. 8 and 9 are enlarged cross sectional views of the material sample 26 prior to undergoing cutting (FIG. 8) and after undergoing cutting (FIG. 9) with the razor blade 22.

Referring again to FIGS. 1-4, the material support table 25 can be selectively movable with respect to the bar clamps 28 between a raised position (shown in solid line in FIGS. 3 and 4) and a lowered position (shown in dashed line in FIGS. 3 and 4) to facilitate selective securement of the material sample 26 to the material support table 25. For example, when the material support table 25 is in the raised position, the material sample 26 can be sandwiched between the material support table 25 and the bar clamps 28 such that the material sample 26 is laterally secured between the bar clamps 28 (e.g., in the direction of the shaving stroke). When the material support table 25 is in the lowered position, the material support table 25 can be spaced from the bar clamps 28 to allow the material sample 26 to slide along the material support table 25 (e.g., in a direction of travel that is substantially parallel to the shaving stroke). A biasing member 80 can be disposed between the base 24 and the material support table 25 and can be configured to urge the material support table 25 into the raised position. In one embodiment, the biasing member 80 can be a spring, but other suitable alternative biasing members are contemplated.

The material support table 25 can be provided in the raised position during a shaving stroke. The material sample 26 can accordingly be held taut between the bar clamps 28 when the razor blade 22 passes over the material sample 26 which can prevent the material sample 26 from folding or otherwise shifting in response to the shaving stroke. Once the shaving stroke has been completed, the material support table 25 can be moved into the lowered position thereby freeing the material sample 26 from the bar clamps 28. The material sample 26 can then be slid along the material support table 25 to move the shaved portion of the material sample 26 away and to introduce an unshaved portion of the material sample 26 beneath the blade retention assembly 64 for shaving during the next test. In one embodiment, the material sample 26 can be dispensed from a spool that is provided at an end of the material support table 25.

Figure 3:
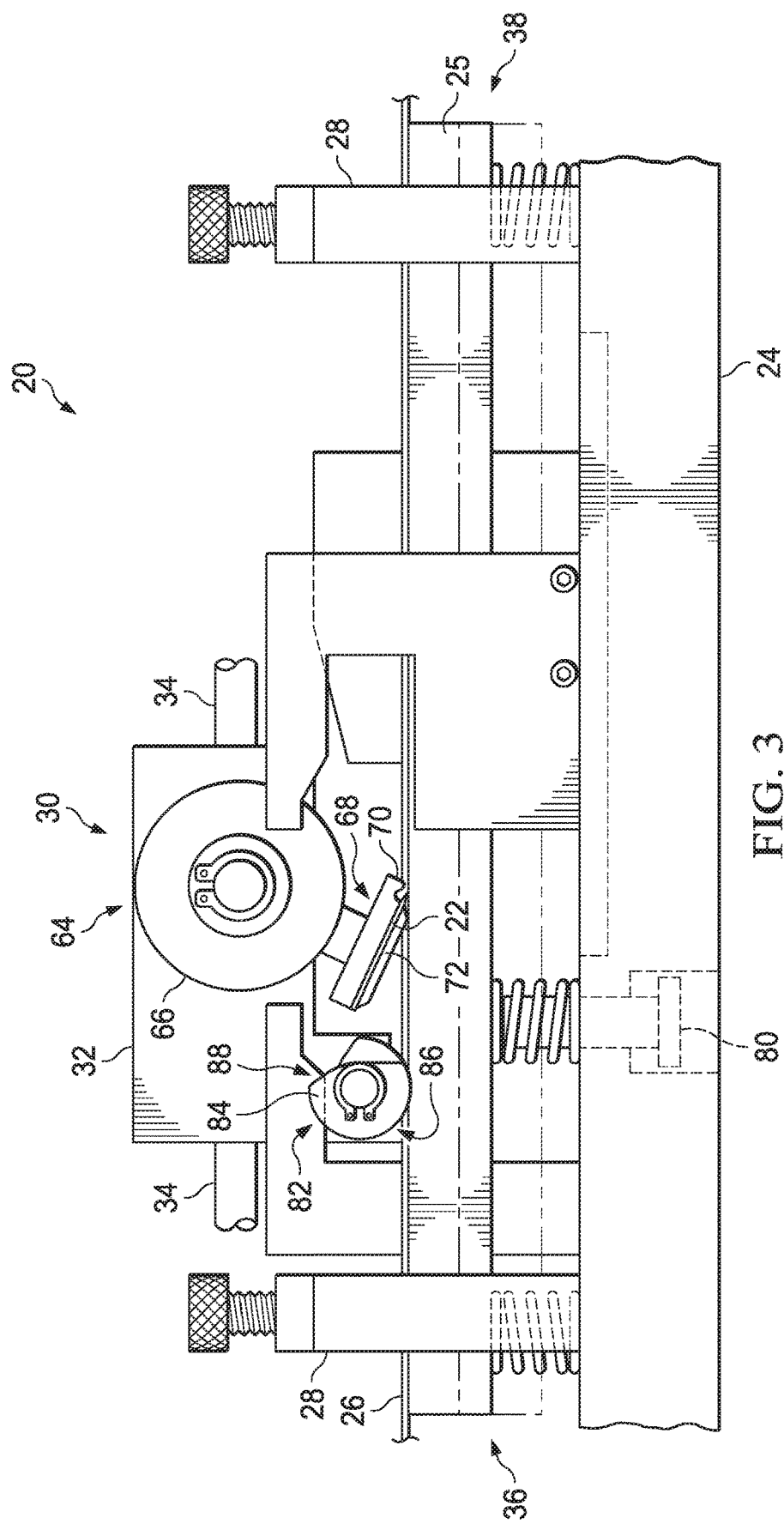
FIG. 3 is a side view depicting the testing apparatus of FIG. 1.
Figure 4:
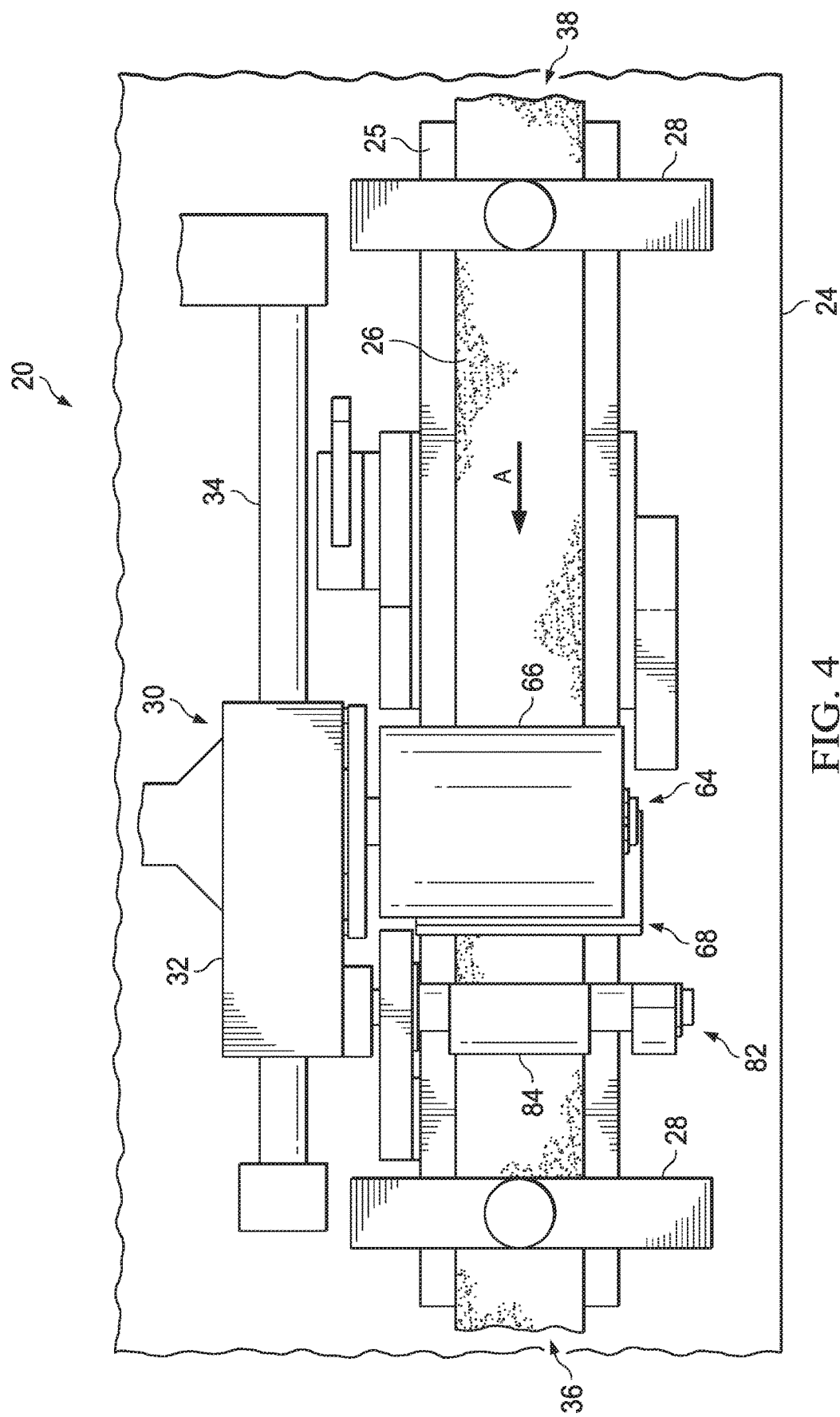
FIG. 4 is a top plan view depicting the testing apparatus of FIG. 1.

The testing apparatus 20 can include a feed actuator 82 having a feed cam 84 that is rotatably coupled with the transport carriage 30 such that it is movable together with the transport carriage 30 between the start and end position. The feed cam 84 can be rotatable between an engaged position (FIG. 3) and a disengaged position (not shown) to facilitate movement of the material support table 25 between the raised position and the lowered position, respectively. As illustrated in FIG. 3, the feed cam 84 can include a cylindrical portion 86 and a flattened portion 88 that is adjacent to the cylindrical portion 86 and has a smaller radius than the cylindrical portion 86. When the feed cam 84 is in the engaged position, the cylindrical portion 86 can abut the material support table 25 to urge the material support table 25 into the lowered position. When the feed cam 84 is in the disengaged position, the flattened portion 88 can overlie the material support table 25 to allow the material support table 25 to be provided in the raised position.

The feed cam 84 can be provided in the disengaged position during a shaving stroke such that the material support table 25 table is in the raised position. The feed cam 84 can accordingly be spaced far enough from the material sample 26 to allow the feed cam 84 to pass along the material sample 26 (e.g., slide with respect to the material sample 26) as the transport carriage 30 moves from the start position to the end position. Once the shaving stroke is completed, the feed cam 84 can be rotated into the engaged position which can urge the material support table 25 into the lowered position thereby freeing the material sample from the bar clamps 28. As the transport carriage 30 is moved from the end position back to the start position (e.g., the return stroke) the feed cam 84 can remain in the engaged position to pull the material sample 26 in the direction of the return stroke thereby providing a new, unshaved portion of the material sample 26 under the blade retraction assembly 64 for shaving on a subsequent shaving stroke. In one embodiment, the feed cam 84 can be pneumatically powered from the pneumatic fluid network 42. It is to be appreciated, however, that the feed cam 84 can be powered with any of a variety of suitable alternative mechanisms, such as an electric servo motor, for example.

The operation of the testing apparatus 20 for testing the razor blade 22 will now be described. First, with the blade retention assembly 64 in the blade disengaged position, the razor blade 22 can be loaded into the razor clamp 68 by inserting the razor blade 22 between the guard member 70 and the clamping member 72 and securing them together (e.g., via fasteners). The blade retention assembly 64 can then be pivoted into the blade-engaged position (either manually or through automation) such that the razor blade 22 contacts the material sample 26. The user can then actuate the actuator 58 to start the testing process. If the feed cam 84 is still in the engaged position (from the previous test), it can be automatically rotated into the disengaged position such that the material support table 25 is in the raised position. The transport carriage 30 can then slide from the start position to the end position to shave the material sample 26 with the razor blade 22 (e.g., the shaving stroke). When the transport carriage 30 arrives at the end position, the blade retention assembly 64 can be pivoted into the blade disengaged position. In one embodiment, the pneumatic fluid network 42 can facilitate pivoting of the blade retention assembly 64 into the blade disengaged position but, in other embodiments, the blade retention assembly 64 can be pivoted electrically, manually or through any of a variety of other suitable methods. Once the blade retention assembly 64 is in the disengaged position, the feed cam 84 can be rotated into the engaged position thereby moving the material support table 25 into the lowered position. The transport carriage 30 can then move from the end position to the start position which can pull the material sample 26 along the material support table 25 to provide a new shaving area for the blade retention assembly 64. Once the transport carriage 30 reaches the starting position, the testing process can end to allow for the razor blade 22 to be removed and replaced with another razor blade 22. When the testing process is ready to be initiated again, the user can actuate the actuator 58.

When the razor blade 22 is removed from the blade retention assembly 64, the tip bending resistance of the razor blade 22 (e.g., the ability of the blade to withstand the bending stresses imposed during shaving) can be determined by observing (e.g., with a microscope) how much damage to the cutting edge 74 was incurred by shaving the material sample 26. If the tip bending resistance of the razor blade 22 does not meet or exceed a desired standard set by the tester (e.g., the manufacturer), the particular razor blade design or type can be deemed unsuitable for commercial sale. It is to be appreciated that testing performed with the testing apparatus can be easily repeated for different razor blade designs or types thus providing a more cost effective and simplified testing method as compared with conventional testing methods.

Once the testing with the testing apparatus 20 on the razor blade 22 is complete, an additional test can be conducted that measures cutting force to determine the blade sharpness and other attributes of the razor blade 22 to determine if they are suitable for mass production. One example of such a test is the wool felt cutter test. The wool felt cutter testis a test which measures the cutting forces of the blade by measuring the force required by each blade to cut through wool felt. Each blade is run through the wool felt cutter about five times and the force of each cut is measured on a recorder. The lowest of five cuts is generally defined as the cutting force. A finished blade that has cutting force of greater than about 2.00 lbs. or about 3.00 lbs. is considered to be a relatively high cut force blade and thus, a less efficient cutting blade. A blade with a cutter force of about 1.00 lbs. to about 1.30 lbs. is considered to be a more efficient cutting blade and thus more desirable to a consumer.

Figure 10:
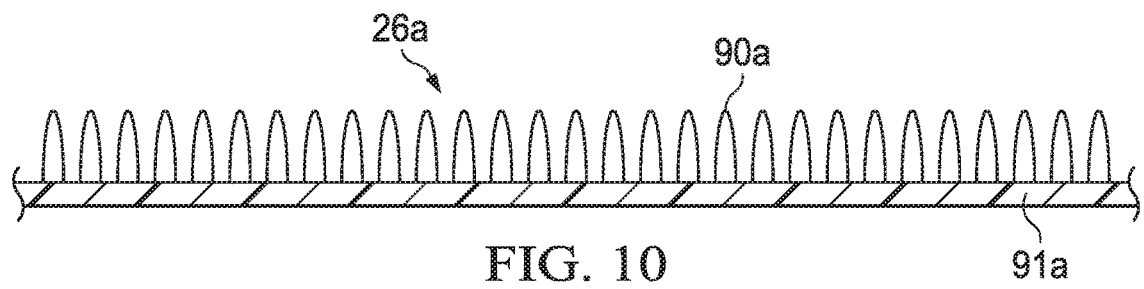
FIG. 10 is cross sectional view depicting a material sample for the testing apparatus, in accordance with another embodiment.
Figure 11:
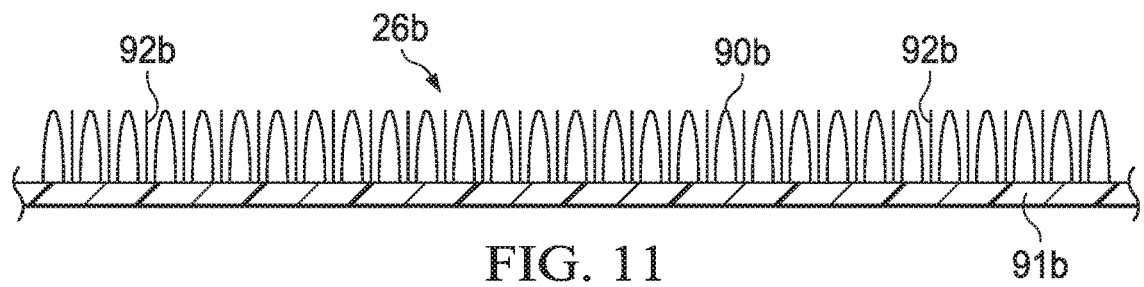
FIG. 11 is cross sectional view depicting a material sample for the testing apparatus, in accordance with yet another embodiment.
Figure 12:
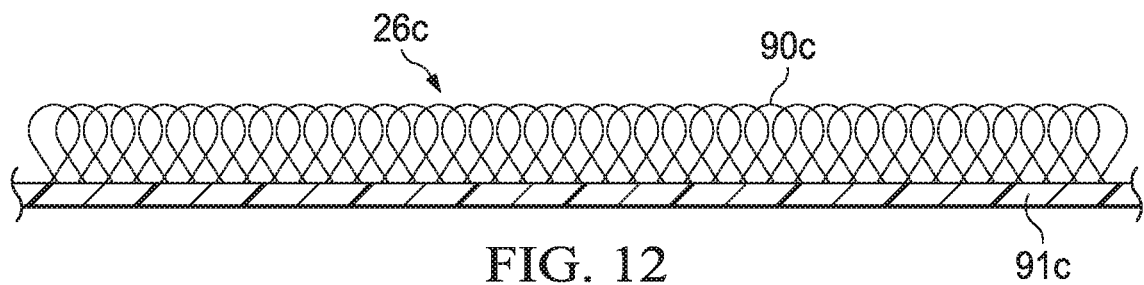
FIG. 12 is cross sectional view depicting a material sample for the testing apparatus, in accordance with yet another embodiment.
Figure 13:
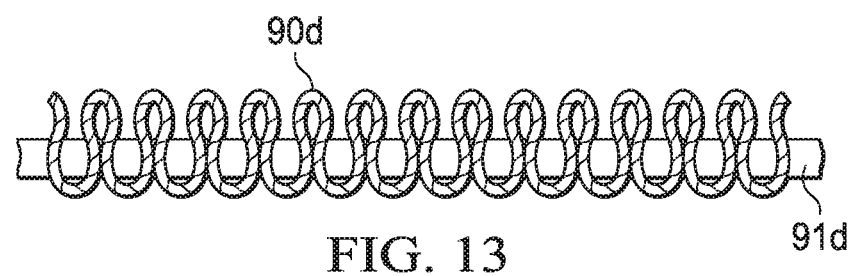
FIG. 13 is cross sectional view depicting a material sample for the testing apparatus, in accordance with still yet another embodiment.

It is to be appreciated that different types of material can be selected for the material sample 26 in order to achieve a desired testing environment. In one embodiment, the material sample 26 can have a layer of looped fibers such as can be found in a hook and loop type fastening arrangement (e.g., Velcro). The looped fibers can be formed of synthetic fibers such as Polyester, Teflon, Rayon, Nylon or Polypropylene. The looped fibers can be provided in any of a variety of arrangements. One embodiment of a material sample 26*a* is illustrated in FIG. 10 and is shown to include a plurality of looped fibers 90*a* that are stitched into (sewn) into a substrate 91*a* and are spaced from each other and are provided in matrix. Another embodiment of a material sample 26*b* is illustrated in FIG. 11 and is shown to include a plurality of looped fibers 90*b* together with a plurality of elongated fibers 92*b* that are interspersed throughout the looped fibers 90*a*. The plurality of looped fibers 90*b* and elongated fibers 92*b* are spaced from each other and are provided in matrix. Another embodiment of a material sample 26*c* is illustrated in FIG. 11 and is shown to include a plurality of looped fibers 90*c* that overlap one another and are provided in matrix. Another embodiment of a material sample 26*c* is illustrated in FIG. 12 and is shown to include a plurality of looped twisted fibers 90*c* that are attached to (e.g., stitched into or sewn into) a substrate 91*c* and are spaced from one another and are provided in a matrix. Yet another embodiment of a material sample 26*d* is illustrated in FIG. 13 and is shown to include a fiber strand 90*d* that is woven through a substrate 91*d* to form a plurality of loops and are spaced from one another and are provided in matrix.

Figure 14:
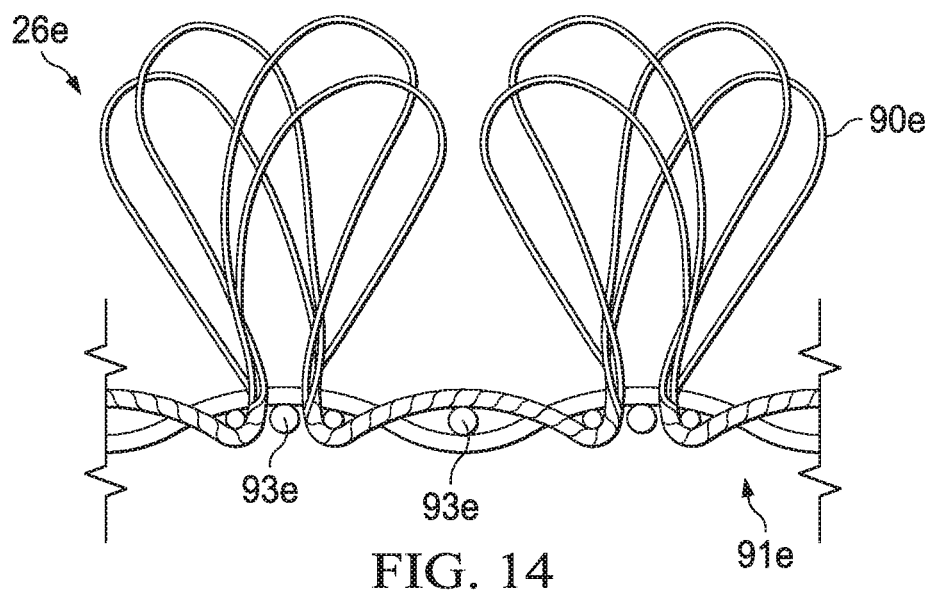
FIG. 14 is cross sectional view depicting a material sample for the testing apparatus, in accordance with still yet another embodiment.
Figure 15:
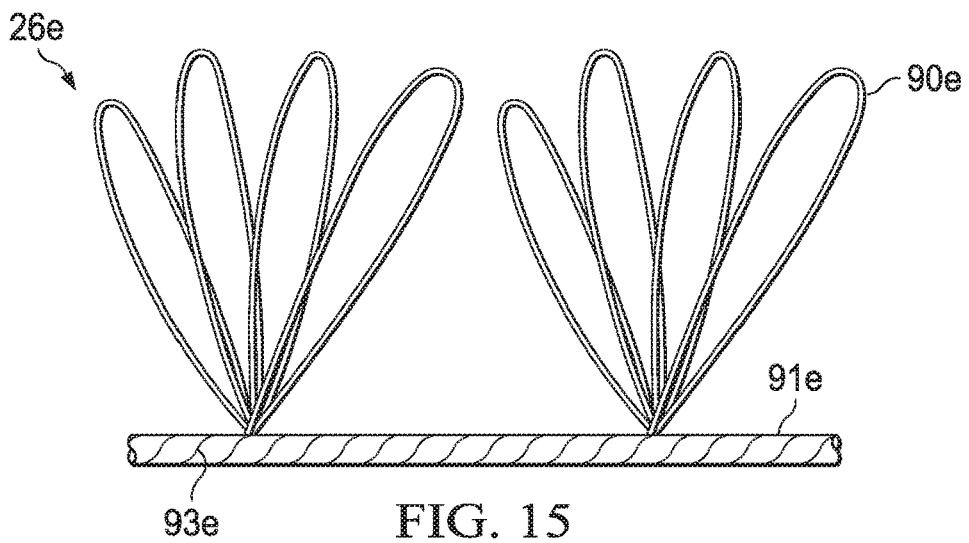
FIG. 15 is side view depicting the material sample of FIG. 14.
Figure 16:
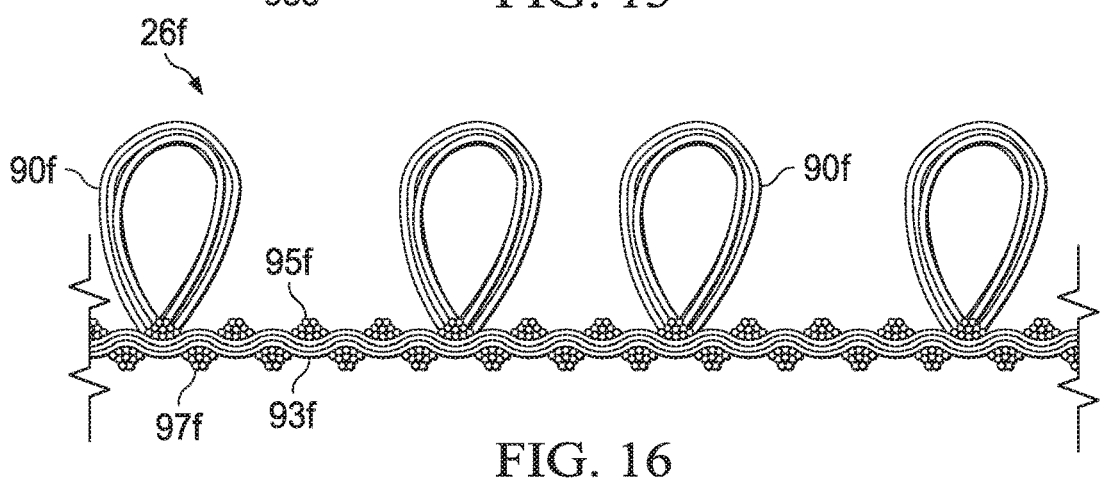
FIG. 16 is cross sectional view depicting a material sample for the testing apparatus, in accordance with still yet another embodiment.

Yet another embodiment of a material sample 26*e* is illustrated in FIGS. 14 and 15 and is shown to include a plurality of looped fiber strands 90*e* that are formed from warp threads woven into a substrate 91*e* through a plurality of weft threads 93*e*. One example of such a configuration is illustrated in U.S. Pat. No. 3,009,235 which is incorporated by reference in its entirety. Still yet another embodiment of a material sample 26*f* is illustrated in FIG. 16 and is shown to include a multifilament yarn 95*f* that forms looped fiber strands 90*f*, a ground warp yarn 97*f*, and a ground weft yarn 93*f*. One example of such a configuration is illustrated in U.S. Pat. No. 9,532,628 which is incorporated by reference in its entirety.

Figure 17:
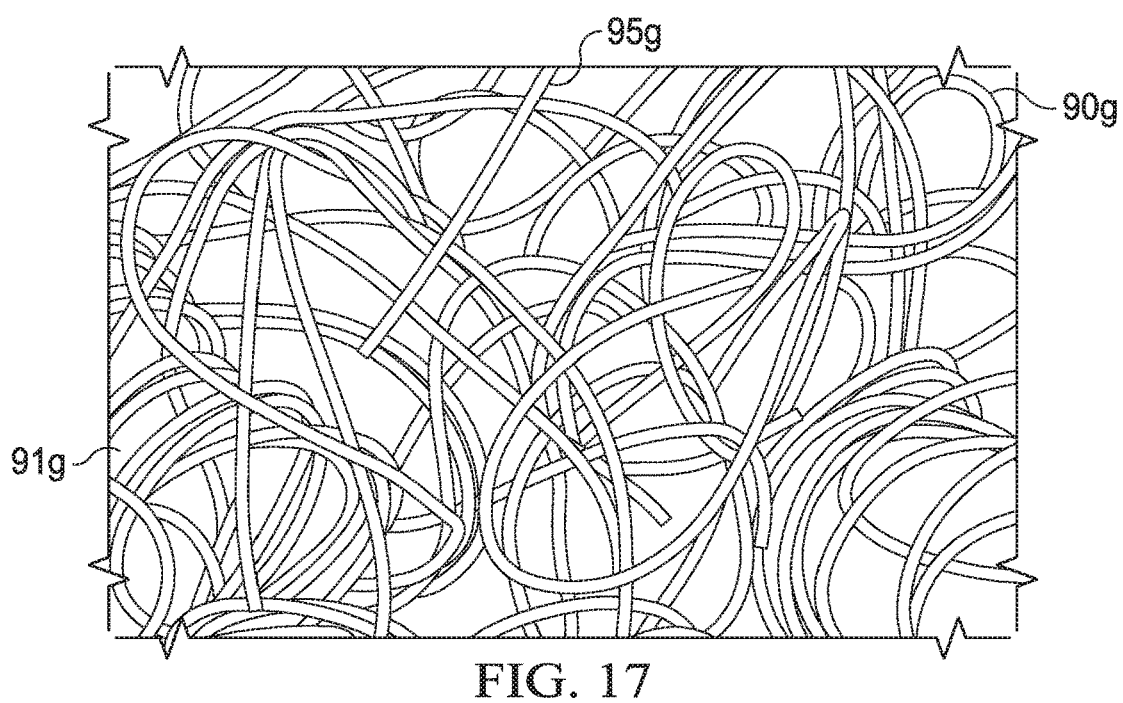
FIG. 17 is an enlarged view depicting a material sample for the testing apparatus, in accordance with still yet another embodiment.
Figure 18:
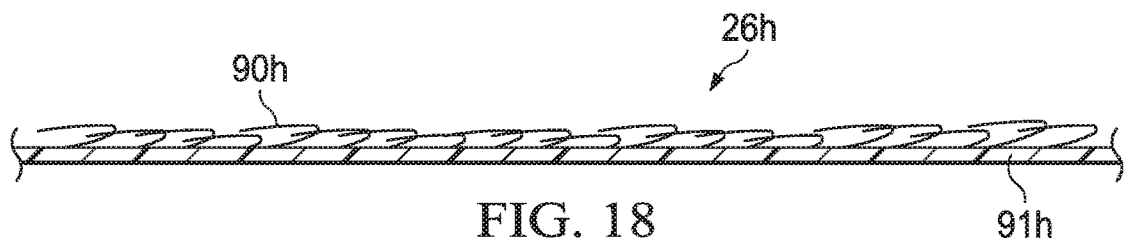
FIG. 18 is cross sectional view depicting a material sample for the testing apparatus, in accordance with still yet another embodiment.

Yet another embodiment of a material sample 26*g* is illustrated in FIG. 17 that includes a substrate 91*g* having a plurality of fused fibers 95*g* and a field of loops 90*g* that cooperate to form a web. One example of such a configuration is illustrated in U.S. Patent Pub. No. 2016/0345686 which is incorporated by reference in its entirety. Yet another embodiment of a material sample 26*h* is illustrated in FIG.

18 that includes a plurality of looped fibers 90h that extend from a substrate 91h and are lying on their side, where the loops of the looped fibers are facing all in the same direction as shown or in different directions (not shown).

Figure 19:
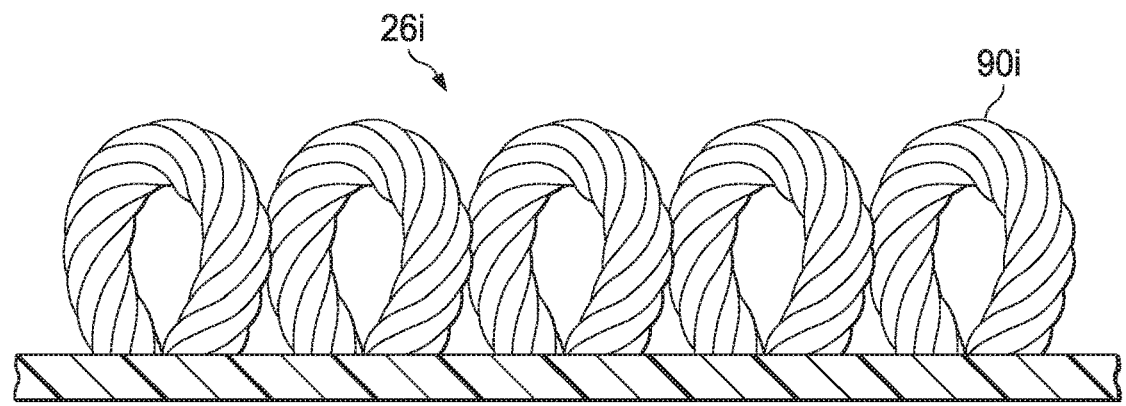
FIG. 19 is cross sectional view depicting a material sample for the testing apparatus, in accordance with still yet another embodiment.
Figure 20:
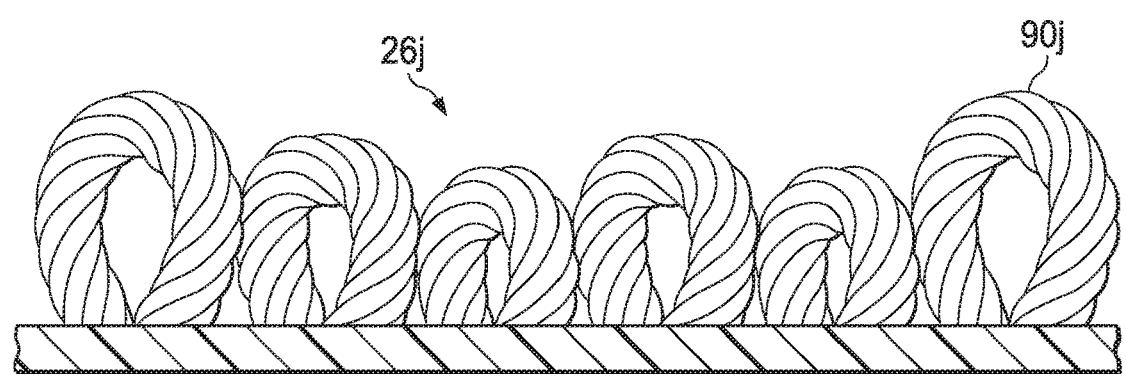
FIG. 20 is cross sectional view depicting a material sample for the testing apparatus, in accordance with still yet another embodiment.

Other embodiments of material samples 26i, 26j are illustrated in FIGS. 19 and 20 respectively. Each of these embodiments illustrates an example of looped pile materials and comprises looped cords 90i, 90j that are attached to a substrate 91i, 91j. The looped cords 90i of the embodiment illustrated in FIG. 19 are substantially the same height (i.e., provided in a "level loop" arrangement). Some of the looped cords 90j of the embodiment illustrated in FIG. 20 are different heights (i.e., provided in a "multi-level loop" arrangement). Various examples of products that include such arrangements are scouring pads, looped pile carpeting, terrycloth material, or other looped fabrics.

Figure 21:
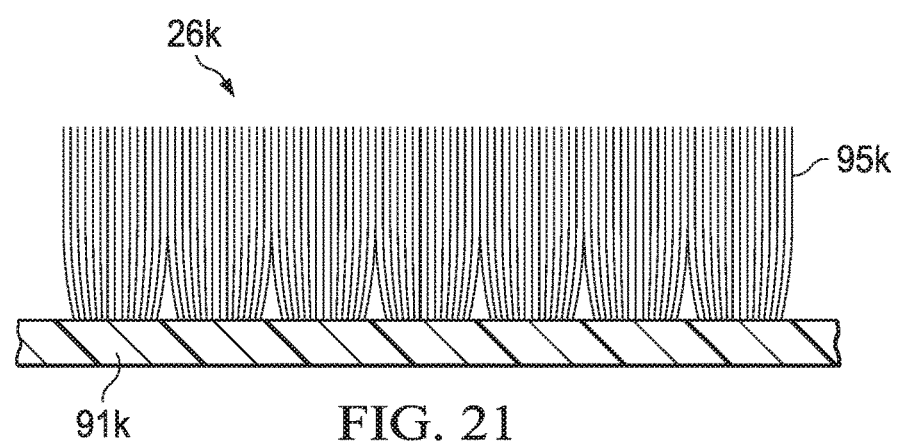
FIG. 21 is cross sectional view depicting a material sample for the testing apparatus, in accordance with still yet another embodiment.
Figure 22:
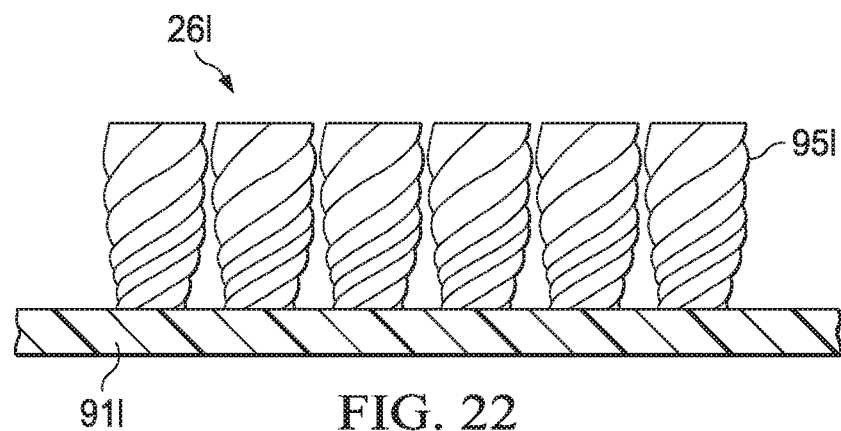
FIG. 22 is cross sectional view depicting a material sample for the testing apparatus, in accordance with still yet another embodiment.
Figure 23:
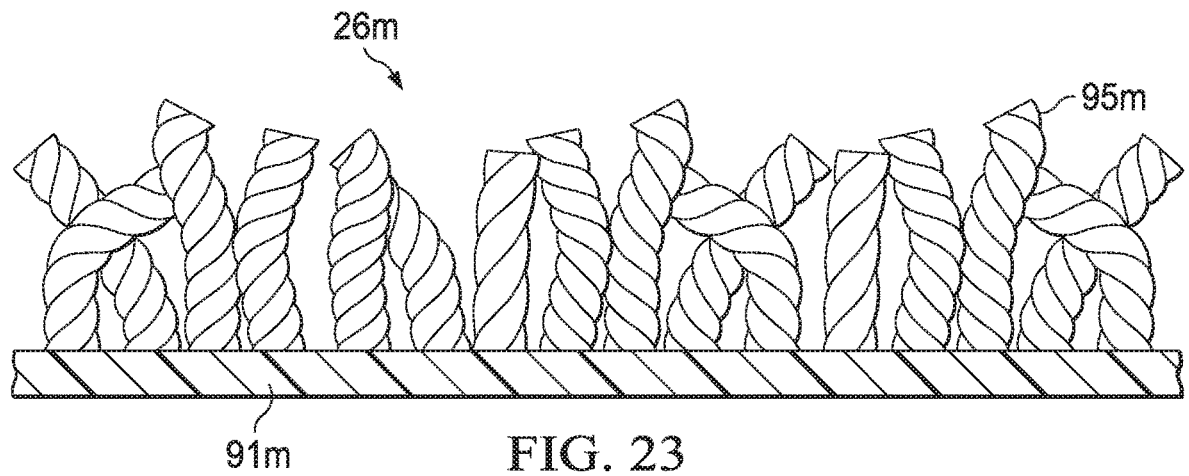
FIG. 23 is cross sectional view depicting a material sample for the testing apparatus, in accordance with still yet another embodiment.

Still other embodiments of material samples 26k, 26l, 26m are illustrated in FIGS. 21-23 respectively. Each of these embodiments illustrates an example of cut pile materials and comprises fibers 95k, 95l, 95m that are attached to a substrate 91k, 91l, 91m. The fibers 95k of the embodiment illustrated in FIG. 21 are provided in individual bundles (e.g., tufts) that provide a substantially even upper surface for cutting. The fibers 95l of the embodiment illustrated in FIG. 22 are provided in individual twisted bundles (e.g., tufts) that provide a substantially even upper surface for cutting. The fibers 95m of the embodiment illustrated in FIG. 21 are provided in highly twisted individual bundles (e.g., tufts) that are curled and randomly deformed to provide a substantially uneven upper surface for cutting.

Figure 24:
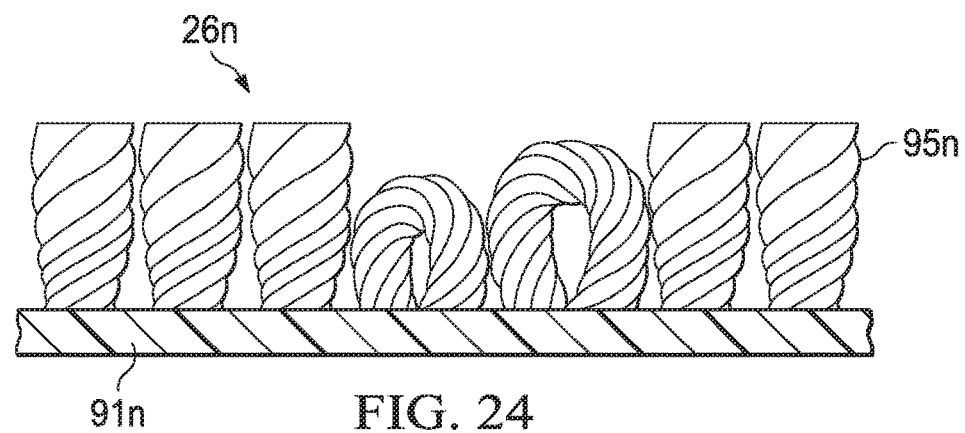
FIG. 24 is cross sectional view depicting a material sample for the testing apparatus, in accordance with still yet another embodiment.

Still yet another embodiment of a material a sample 26n is illustrated in FIG. 24 and illustrates an example of a cut-loop pile material. The material sample 26n and comprises fibers 95n that are attached to a substrate 91n. Some of the fibers 95n are provided in individual bundles (e.g., tufts) and others of the fibers 95n are provided as loops such that they cooperate to provide a substantially uneven upper surface for cutting.

It is to be appreciated that the material sample 26 can be formed of any of a variety of suitable additional or alternative synthetic or natural materials (e.g., silk) that facilitate testing of the tip bending resistance of the razor blade 22 with the testing apparatus 20. For example, the material sample 26 can include metal fibers in addition to or in lieu of any polymeric fibers on the material sample 26. The metal fibers can be formed of copper, beryllium copper, stainless steel, silver, aluminum, nickel, and/or brass or any of a variety of other metals or metal alloys. It is also to be appreciated that the fibers on the material sample 26 can be understood to mean any material that can be used to test the tip bending resistance of a razor blade and can thus be provided in any of a variety of suitable alternative arrangements than those described herein.

It is to be appreciated that although the material sample 26 is described above as being formed of one or more of synthetic materials (e.g., Polyester, Teflon, Rayon, Nylon or Poly-propylene), natural materials (e.g., silk), metal (e.g., copper, beryllium copper, stainless steel, silver, aluminum, nickel, and/or brass), the disclosure should not be so limited and should be understood to contemplate any material or combination thereof that can engage a razor blade to facilitate testing thereof.

Figure 25:
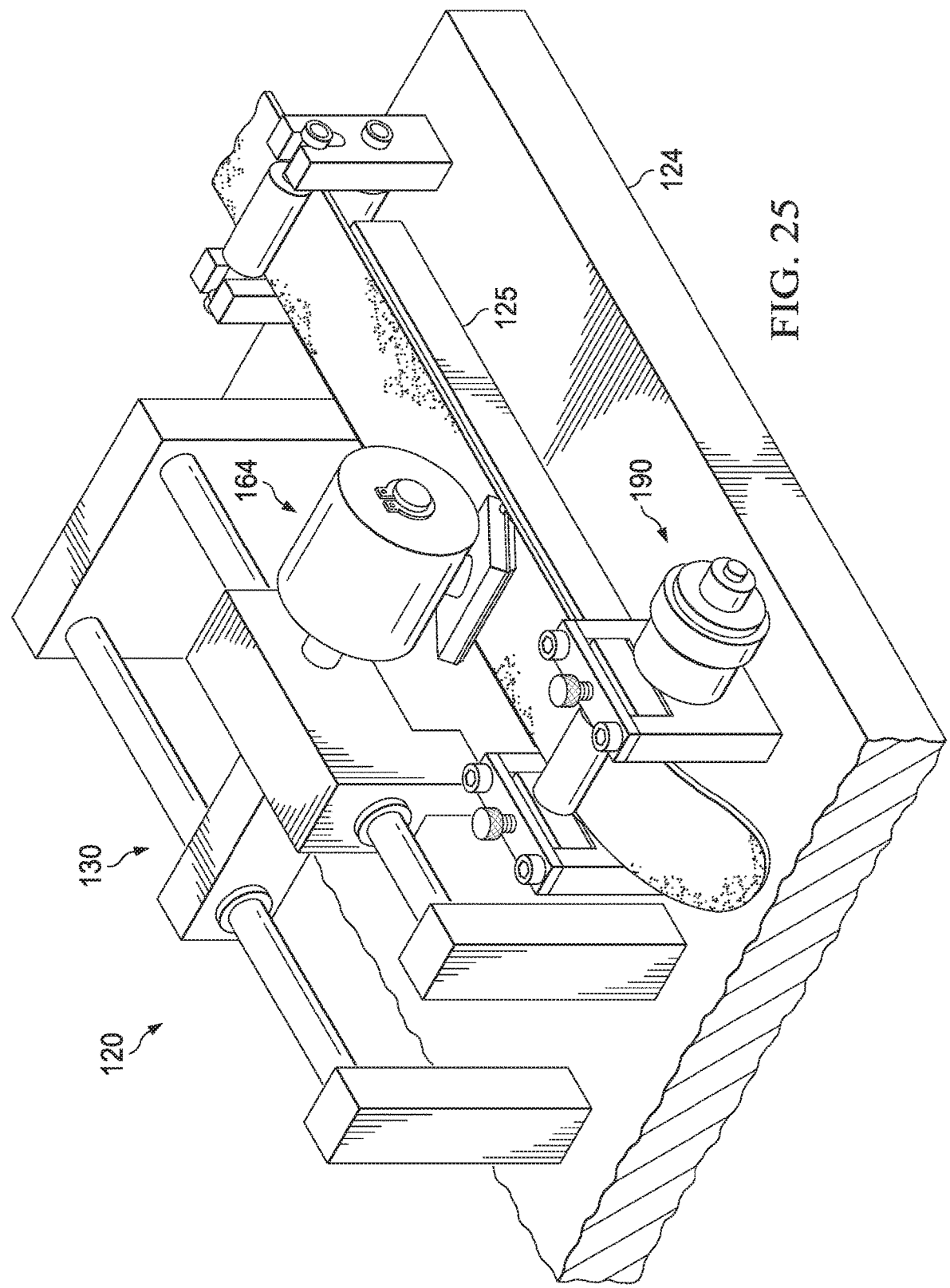
FIG. 25 is an isometric view depicting a testing apparatus for a razor blade, in accordance with another embodiment.
Figure 26:
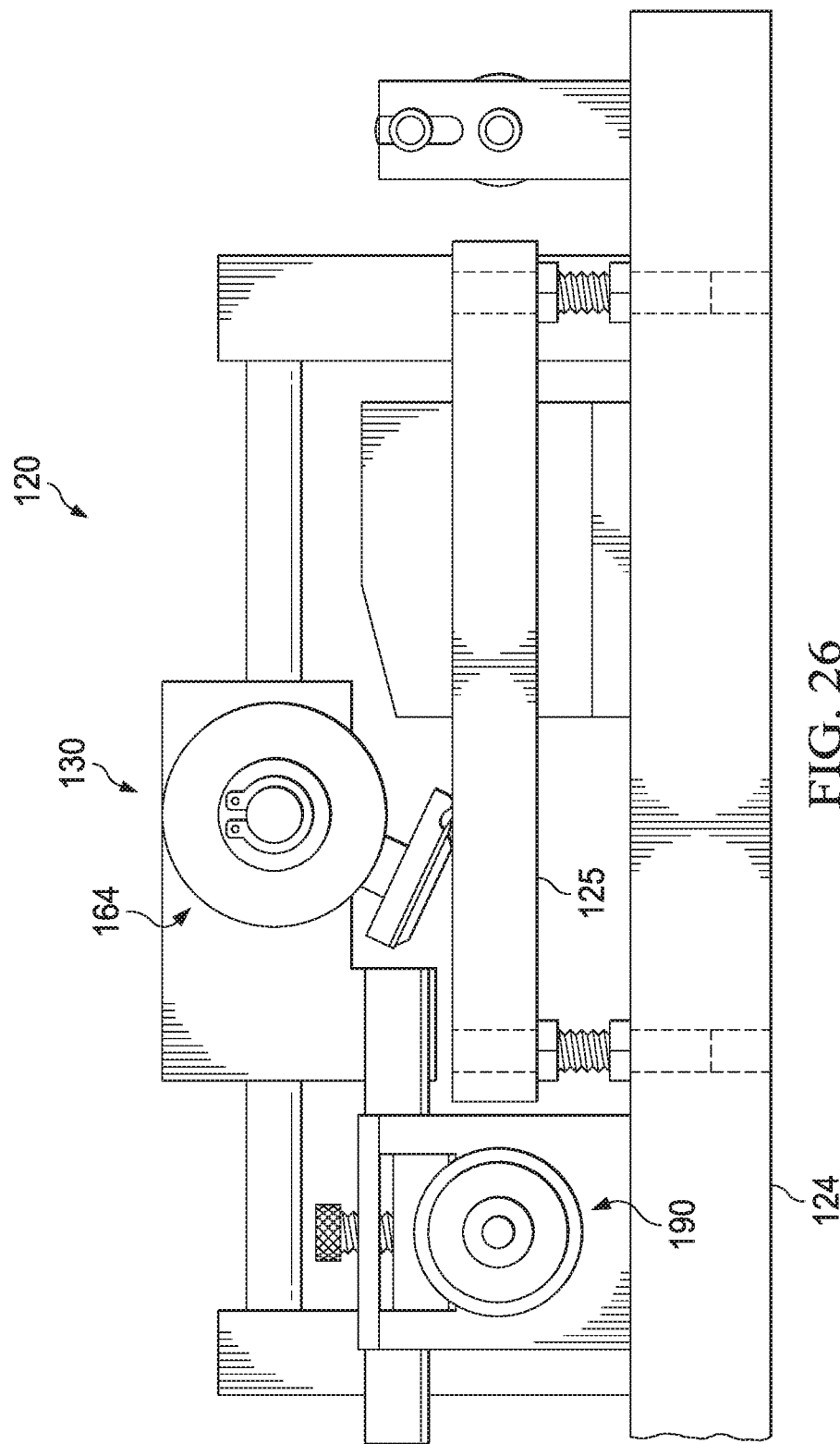
FIG. 26 is a side view depicting the testing apparatus of FIG. 25.
Figure 27:
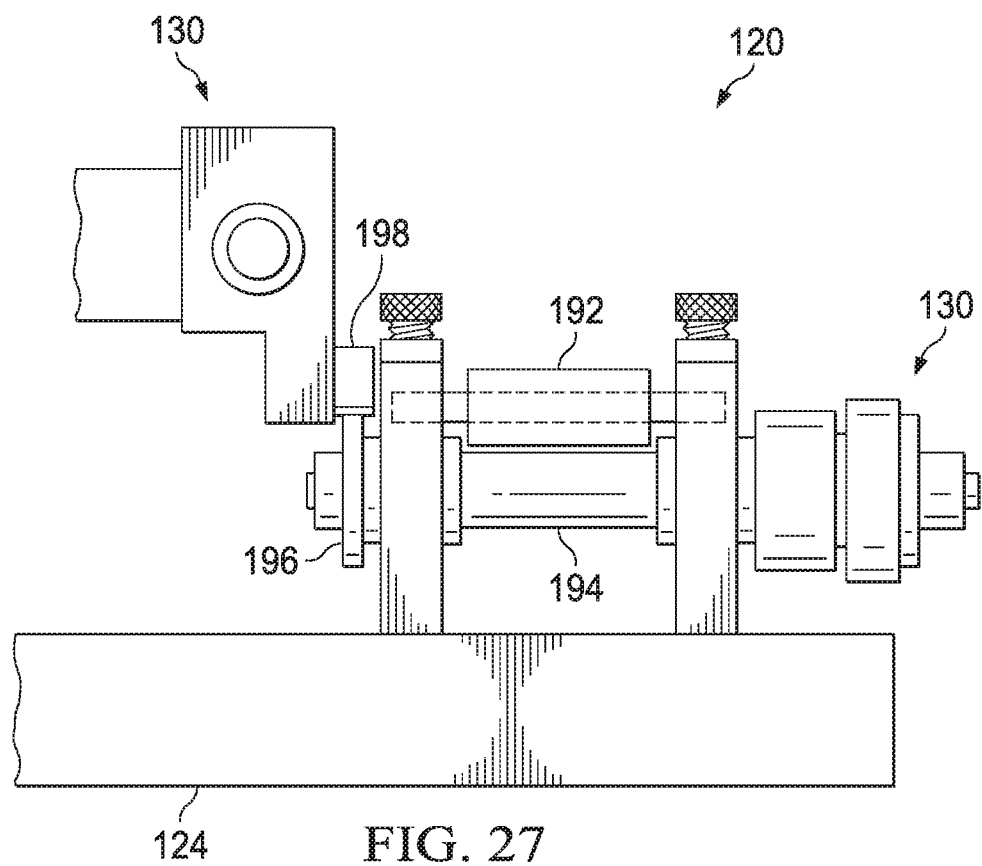
FIG. 27 is a front view depicting the testing apparatus of FIG. 25 with certain components removed for clarity of illustration.

FIGS. 25-27 illustrate a testing apparatus 120 according to another embodiment. The testing apparatus 120 can be similar to or the same as in many respects as the testing apparatus 20 illustrated in FIGS. 1-6. For example, the testing apparatus 120 can include a base 124, a material support table 125, a transport carriage 130, and a blade retention assembly 164. However, in lieu of a feed actuator (e.g., 82 in FIGS. 1-6), the testing apparatus 120 can include a feed roller 190 disposed at a front end 136 of the base 124. The feed roller 190 can be configured to facilitate pulling of a material sample (e.g., 26) along the material support table 125. As illustrated in FIG. 27, the feed roller 190 can include an upper idler roller 192 and a lower drive roller 194. A material sample (e.g., 26) can be provided between the upper idler roller 192 and the lower drive roller 194. When the material sample is to be advanced (e.g., during the return stroke of the transport carriage 130), the lower drive roller 194 can be rotated to pull the material sample 26 through the feed roller 190. As illustrated in FIG. 27, the lower drive roller 194 can include a pinion gear 196, and the transport carriage 130 can include a rack gear 198 that is meshed with the pinion gear 196. When the transport carriage 130 is slid from the end position to the start position, the rack gear 198 can facilitate rotation of the pinion gear 196 to drive the lower drive roller 194. The lower drive roller 194 can include an internal clutch (not shown) that permits one way rotation of the lower drive roller 194. As such, when the transport carriage 130 is slid from the start position to the end position, the pinion gear 196 can be rotated accordingly, but the internal clutch prevents the lower drive roller 194 from rotating.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for testing edge damage on a razor blade, the method comprising:
   providing a material sample having a plurality of looped synthetic fibers extending therefrom, the synthetic fibers having a diameter of between about 20 μm and about 200 μm; and
   shaving the material sample with the razor blade.

2. The method of claim 1 wherein shaving the material sample with the razor blade comprises:
   engaging blade with the material sample; and
   moving with a transport carriage from a start position to an end position.

3. The method of claim 2 wherein engaging the blade with the material sample comprises moving a blade retention assembly that retains the razor blade to a blade-engaged position from a blade disengaged position.

4. The method of claim 3 further comprising, after moving the transport carriage, moving the blade retention assembly to the blade disengaged position.

5. The method of claim 1 further comprising, prior to shaving, attaching the razor blade to a blade retention assembly.

6. The method of claim 5 further comprising, subsequent to shaving, detaching the razor blade from the blade retention assembly.

7. The method of claim 1 further comprising, subsequent to shaving, providing a new unshaved portion of the material sample for shaving.

8. The method of claim 7 wherein providing a new unshaved portion of the material sample for shaving comprises moving a material support table to a lowered position and pulling the material sample along the material support table.

\* \* \* \* \*